United States Patent
Li et al.

(10) Patent No.: US 8,121,097 B2
(45) Date of Patent: Feb. 21, 2012

(54) TRANSMISSION WITH HOPPING FOR PEER-PEER COMMUNICATION

(75) Inventors: Junyi Li, Chester, NJ (US); Saurabh Tavildar, Jersey City, NJ (US); Thomas Richardson, South Orange, NJ (US); Ying Wang, Easton, PA (US); Aleksandar Jovicic, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 12/264,661

(22) Filed: Nov. 4, 2008

(65) Prior Publication Data
US 2010/0110929 A1    May 6, 2010

(51) Int. Cl.
*H04J 3/00* (2006.01)
*H04B 7/212* (2006.01)

(52) U.S. Cl. ........................ 370/337; 370/347
(58) Field of Classification Search ........................ None
See application file for complete search history.

(56) References Cited

U.S. PATENT DOCUMENTS

| | | | |
|---|---|---|---|
| 7,366,223 B1 | 4/2008 | Chen et al. | |
| 2006/0280142 A1* | 12/2006 | Damnjanovic et al. | 370/329 |
| 2007/0177732 A1* | 8/2007 | Schotten et al. | 380/215 |
| 2007/0263735 A1* | 11/2007 | Tong et al. | 375/260 |
| 2008/0095288 A1* | 4/2008 | Schwoerer et al. | 375/359 |
| 2008/0165832 A1* | 7/2008 | Fukuda et al. | 375/134 |
| 2008/0232432 A1* | 9/2008 | Lee et al. | 375/140 |
| 2008/0247356 A1* | 10/2008 | Takahashi et al. | 370/329 |

FOREIGN PATENT DOCUMENTS

| | | |
|---|---|---|
| EP | 0650304 A2 | 4/1995 |
| EP | 1944875 A2 | 7/2008 |
| WO | WO2004077777 | 9/2004 |
| WO | WO2007095860 A1 | 8/2007 |
| WO | WO2009009572 A2 | 1/2009 |

OTHER PUBLICATIONS

International Search Report and Written Opinion—PCT/US2009/061260—ISAEPO—Jan. 29, 2010.

* cited by examiner

*Primary Examiner* — Andrew Lee
(74) *Attorney, Agent, or Firm* — James K. O'Hare

(57) ABSTRACT

Techniques for transmitting signals using time hopping or time and frequency hopping are described. In one design, a terminal selects different slots to use for transmission in multiple frames with time hopping. Each frame includes multiple slots, and each slot covers a particular time duration. The selected slots are at different time locations in the multiple frames. In another design, a terminal selects different resource units to use for transmission in multiple frames with time and frequency hopping. The selected resource units are at different time and frequency locations in the multiple frames. For both designs, the terminal sends a signal (e.g., a peer discovery signal) in the selected slots or resource units in the multiple frames. The terminal may detect for signals (e.g., peer discovery signals) from other terminals in slots not used for transmission by the terminal.

30 Claims, 6 Drawing Sheets

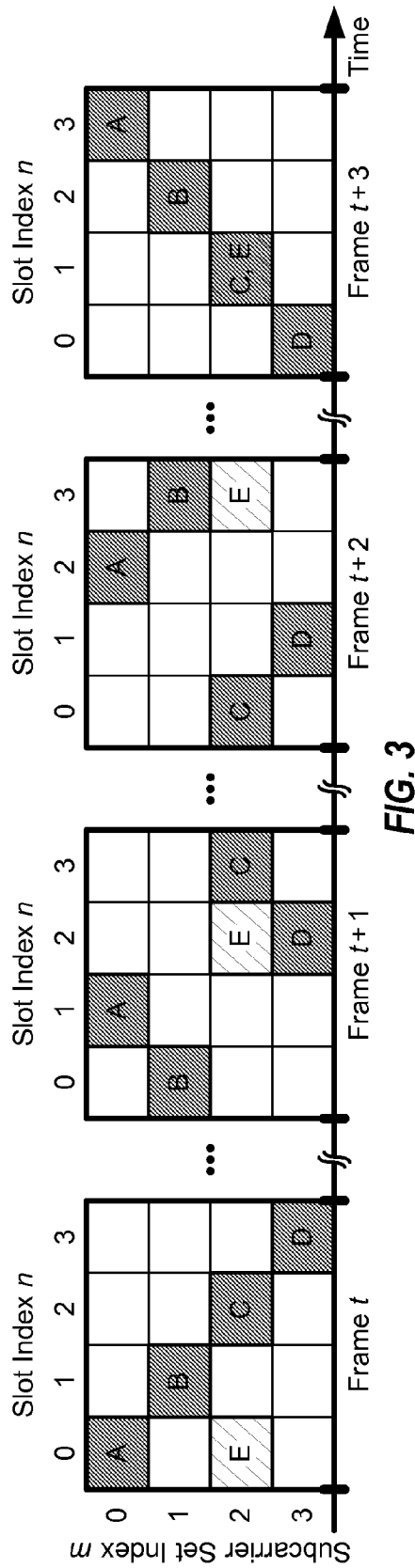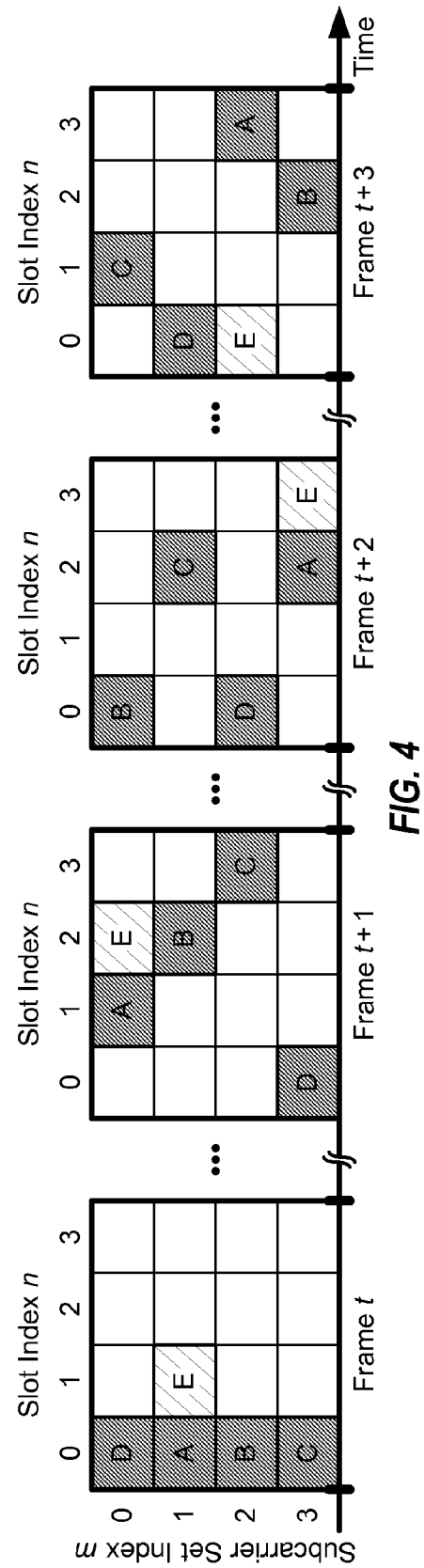
FIG. 3
FIG. 4

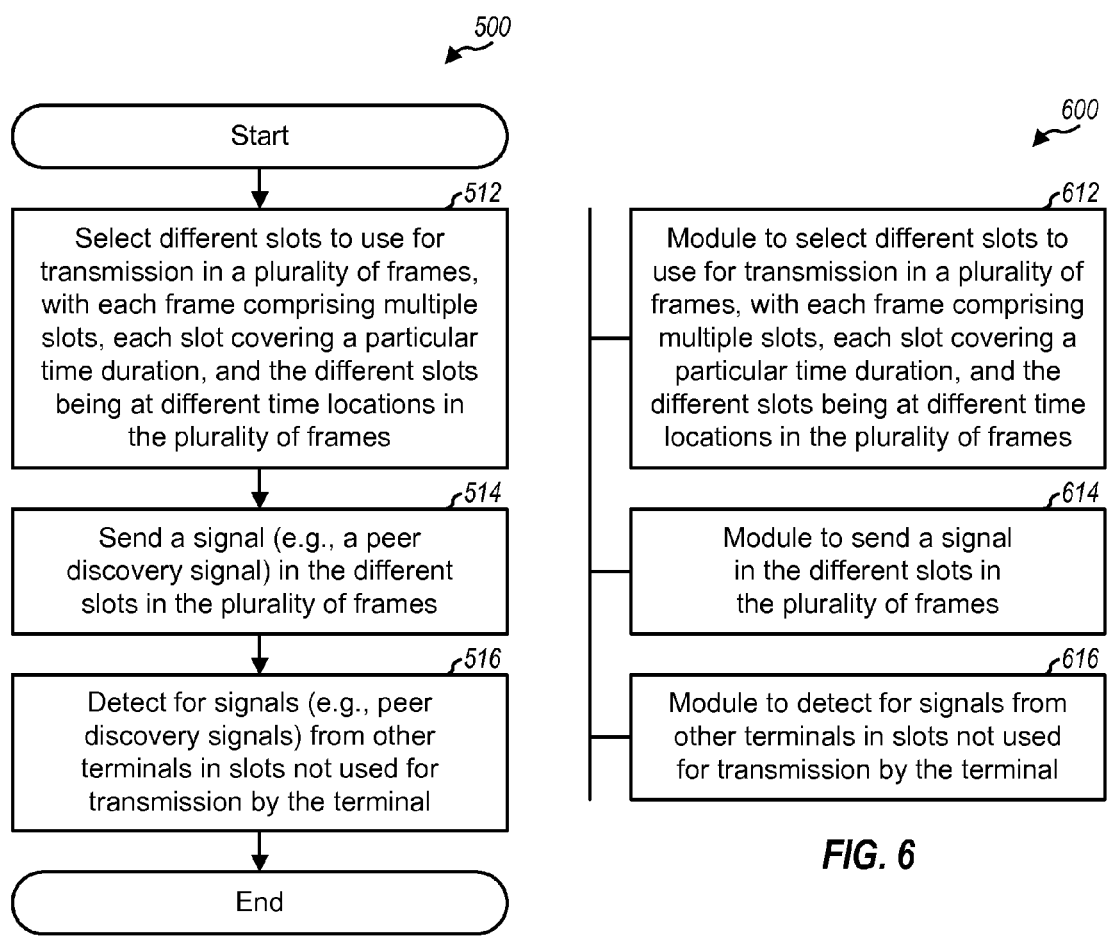

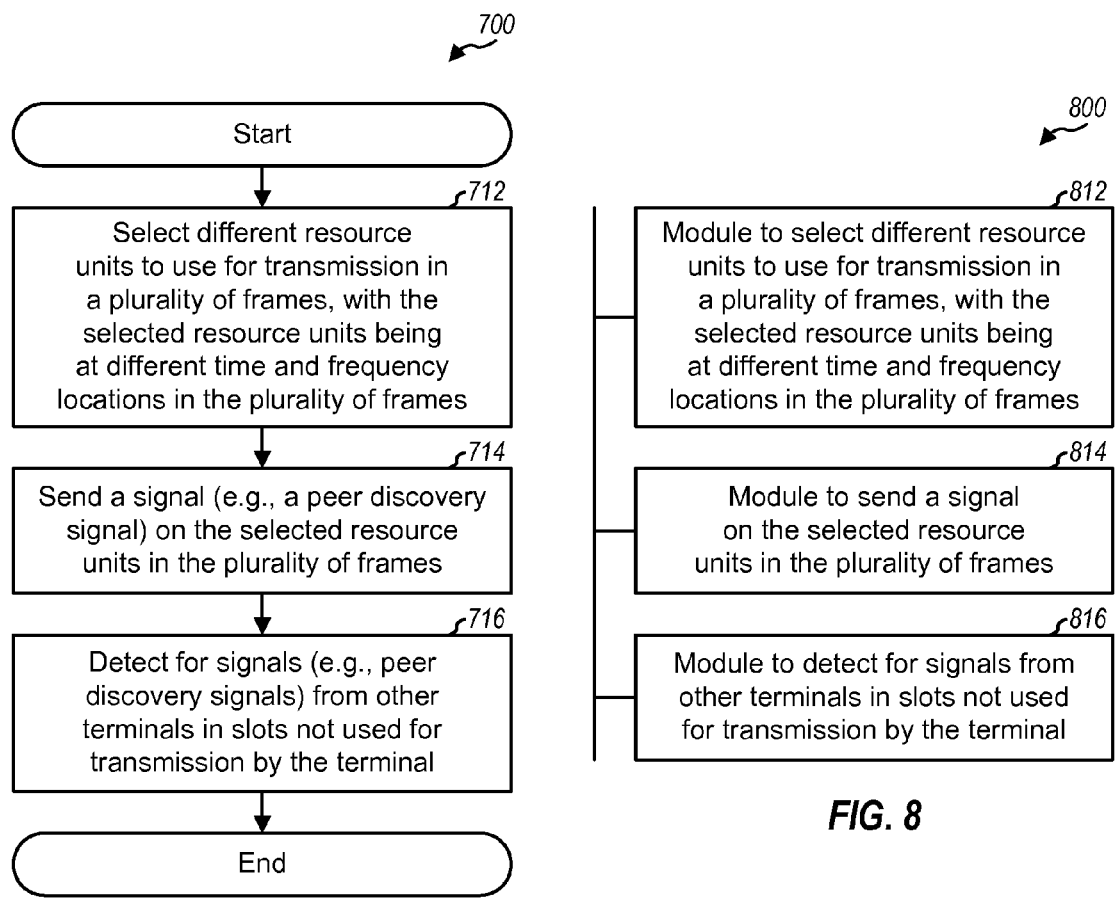

TRANSMISSION WITH HOPPING FOR PEER-PEER COMMUNICATION

BACKGROUND

I. Field

The present disclosure relates generally to communication, and more specifically to transmission techniques for peer-to-peer communication.

II. Background

Wireless communication networks are widely deployed to provide various communication services such as voice, video, packet data, messaging, broadcast, etc. These wireless networks may be capable of supporting communication for multiple users by sharing the available network resources. Examples of such wireless networks include wireless wide area networks (WWANs), wireless metropolitan area networks (WMANs), and wireless local area networks (WLANs).

A wireless communication network may include a number of base stations that can support communication for a number of terminals. Each base station may transmit pilot and system information, which may allow terminals to detect and acquire that base station. A terminal may access the network via a base station and may communicate with the base station.

A terminal may also be able to communicate peer-to-peer with other terminals. When the terminal is first powered up or just moves into a new area, the terminal may not know which other terminals are present. The terminal may perform a discovery process, which may entail (i) transmitting a peer discovery signal to announce the presence of the terminal to other terminals and (ii) receiving peer discovery signals from other terminals to ascertain their presence. It is desirable to efficiently perform discovery.

SUMMARY

Techniques for transmitting signals (e.g., peer discovery signals) using time hopping or time and frequency hopping are described herein. The techniques may allow a terminal to efficiently detect other terminals with half-duplex operation and also in desense scenarios in which a strong signal from one terminal can mask a weak signal from another terminal.

In one aspect, a terminal may select different slots to use for transmission in a plurality of frames with time hopping. Each frame may include multiple slots, and each slot may cover a particular time duration. The selected slots may be at different time locations in the plurality of frames. The terminal may send a signal (e.g., a peer discovery signal) in the selected slots in the plurality of frames. The terminal may detect for signals (e.g., peer discovery signals) from other terminals in slots not used for transmission by the terminal.

In another aspect, a terminal may select different resource units in a plurality of frames with time and frequency hopping. Each resource unit may cover one subcarrier set in one slot. The selected resource units may be at different time and frequency locations in the plurality of frames. The terminal may send a signal (e.g., a peer discovery signal) on the selected resource units in the plurality of frames and may detect for signals (e.g., peer discovery signals) from other terminals in slots not used for transmission.

Various aspects and features of the disclosure are described in further detail below.

BRIEF DESCRIPTION OF THE DRAWINGS

FIG. 3 shows transmissions by five terminals with time hopping.
FIG. 4 shows transmissions by five terminals with time and frequency hopping.
FIG. 5 shows a process for transmission with time hopping.
FIG. 6 shows an apparatus for transmission with time hopping.
FIG. 7 shows a process for transmission with time and frequency hopping.
FIG. 8 shows an apparatus for transmission with time and frequency hopping.

DETAILED DESCRIPTION

The transmission techniques described herein may be used for various wireless communication networks such as WWANs, WMANs, WLANs, etc. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as Universal Terrestrial Radio Access (UTRA), cdma2000, etc. A TDMA network may implement a radio technology such as Global System for Mobile Communications (GSM). An OFDMA network may implement a radio technology such as Evolved UTRA (E-UTRA), Ultra Mobile Broadband (UMB), Flash-OFDM®, etc. Long Term Evolution (LTE) is an upcoming release of "3rd Generation Partnership Project" (3GPP) that uses E-UTRA, which employs OFDMA on the downlink and SC-FDMA on the uplink. A WLAN may implement one or more standards in the IEEE 802.11 family of standards (which is also referred to as Wi-Fi), Hiperlan, etc. A WMAN may implement one or more standards in the IEEE 802.16 family of standards (which is also referred to as WiMAX). The transmission techniques described herein may be used for the radio technologies mentioned above as well as other radio technologies.

Figure 1:
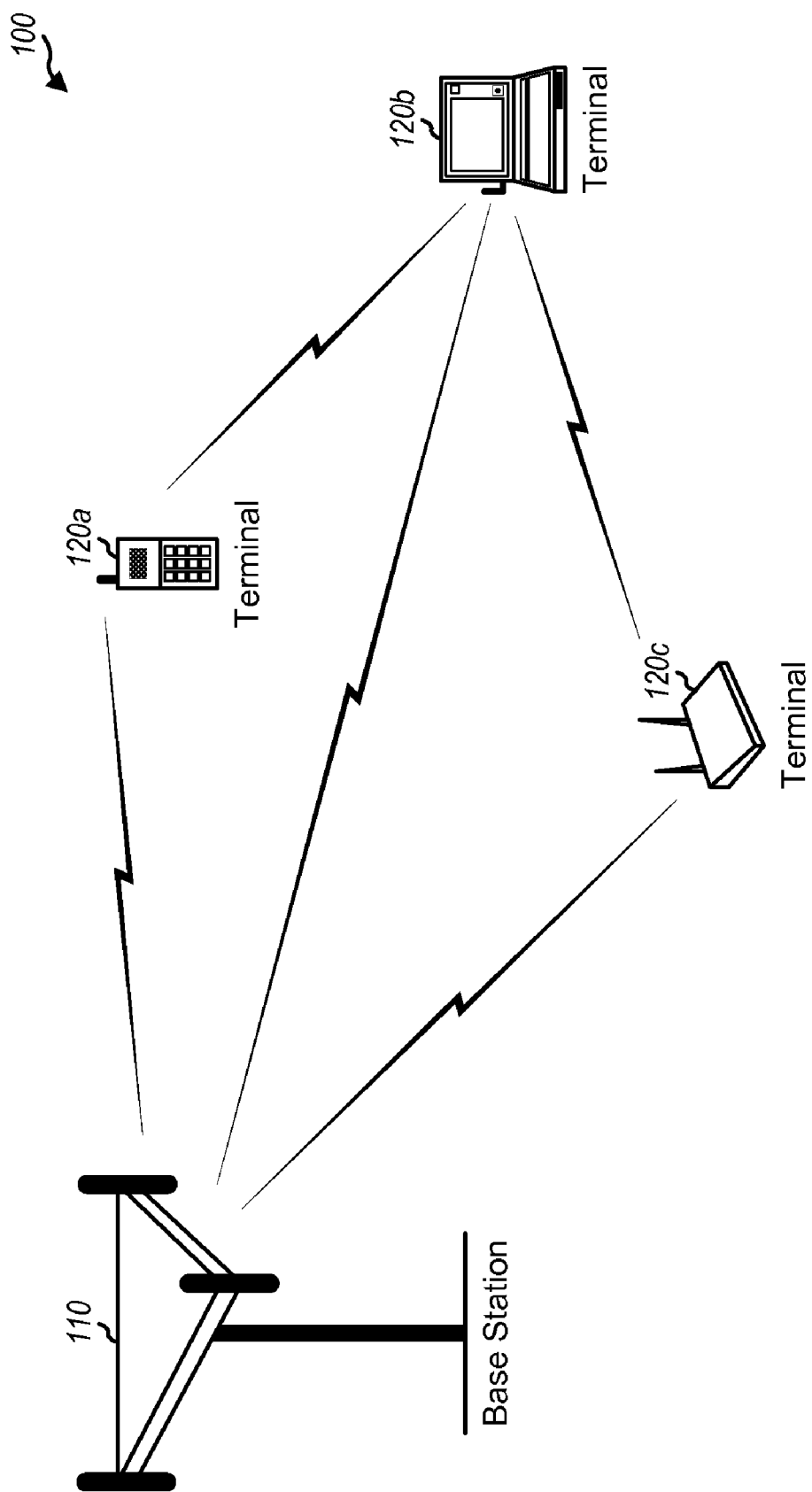
FIG. 1 shows a wireless communication network.

FIG. 1 shows a wireless communication network 100, which may include any number of base stations, any number of terminals, and any number of other network entities. For simplicity, only one base station 110 and three terminals 120a, 120b and 120c are shown in FIG. 1. Base station 110 may be a fixed station that communicates with the terminals and may also be referred to as an access point, a Node B, an evolved Node B (eNB), etc. Base station 110 provides communication coverage for a particular geographic area. The term "cell" can refer to a coverage area of the base station and/or a base station subsystem serving this coverage area.

Terminals 120 may be dispersed throughout the network, and each terminal may be stationary or mobile. A terminal may also be referred to as an access terminal, a mobile station, a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station. Alternatively or additionally, the terminal may communicate peer-to-peer with other terminals.

Figure 2:
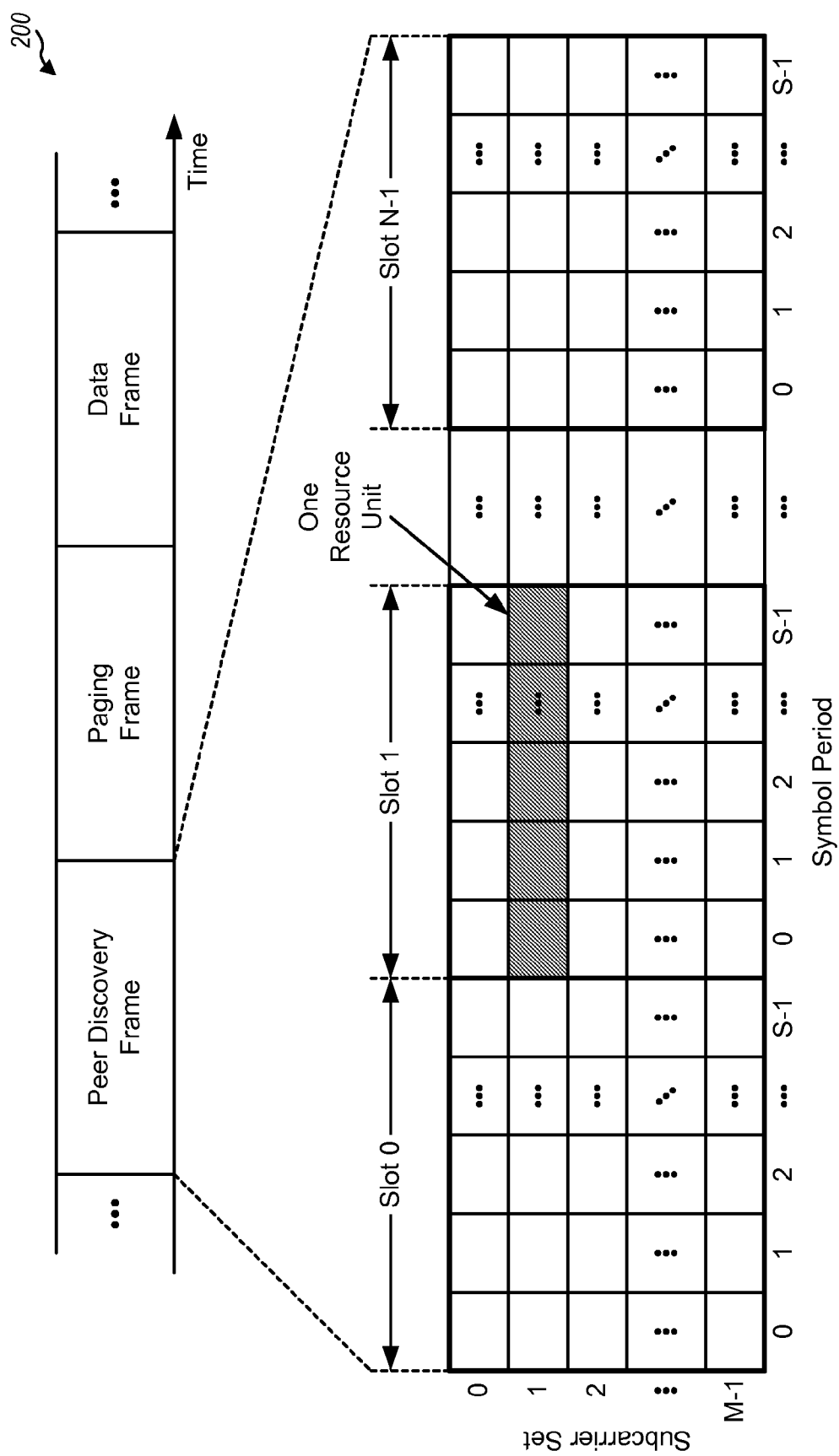
FIG. 2 shows an example transmission structure.

FIG. 2 shows a design of a transmission structure 200 that may be used for wireless network 100. The transmission timeline may be partitioned into units of frames. In the design shown in FIG. 2, different types of information may be sent in different frames. Some frames may be used to send peer discovery signals and may be referred to as peer discovery frames. Some other frames may be used to send paging signals and may be referred to as paging frames. Many or most frames may be used to send data and may be referred to as data frames. Other types of frames may also be defined. The different types of frames may have the same or different time durations. The peer discovery frames may be spaced apart by any suitable duration. A peer discovery frame may be partitioned into N slots with indices of 0 through N−1, where N may be any integer value greater than one. Each slot may include S symbol periods with indices of 0 through S−1, where S may be any integer value.

The available system bandwidth may be partitioned into multiple subcarriers with orthogonal frequency division multiplexing (OFDM), single-carrier frequency division multiplexing (SC-FDM), or some other multiplexing scheme. M subcarrier sets with indices of 0 through M−1 may be defined, where M may be any integer value. Each subcarrier set may include one subcarrier or multiple contiguous or non-contiguous subcarriers.

Resource units may be defined based on the available time and frequency units. A resource unit may also be referred to as a segment, a time frequency block, a resource block, a tile, etc. A resource unit may be a basic unit of time and frequency resources that may be used by a terminal for transmission. In one design, a resource unit covers one subcarrier set in S symbol periods of one slot, as shown in FIG. 2. In this design, M resource units are available in each slot, and a total of M*N resource units are available in one peer discovery frame. The same number of resource units may be available in each slot of a peer discovery frame. Each resource unit within a peer discovery frame may be uniquely identified by an index (m, n), which is composed of a subcarrier set index m and a slot index n.

FIG. 2 shows an example partitioning of time and frequency into units. Time and frequency may also be partitioned in other manners. Resource units may also be defined with other dimensions of time and/or frequency.

The terminals in the network may have knowledge of frame timing and may be able to determine each frame. A terminal may obtain frame timing in various manners. In one design, a terminal may obtain frame timing from a base station in a synchronous network, e.g., base station 110 in FIG. 1. In general, a terminal may obtain frame timing based on any common timing source such as a base station, a satellite, a broadcast station, another terminal, etc.

For peer-to-peer communication, a terminal may announce its presence to other terminals within its vicinity by periodically transmitting a peer discovery signal in peer discovery frames, which are referred to as simply "frames" in much of the description below. The terminal may also detect the presence of other terminals within its vicinity based on peer discovery signals transmitted by these other terminals. The detection of other terminals via peer discovery signals may be challenging for several reasons. First, the terminal may only support half-duplex operation and may be capable of either receiving or transmitting (but not both) at any given moment. In this case, when the terminal transmits its own peer discovery signal in a certain slot, the terminal cannot receive the peer discovery signals transmitted by other terminals in the same slot. For example, M terminals transmitting on M different resource units (0, n) through (M−1, n) of a given slot n would not be able to detect one another in this slot. Second, desensing may become an issue if one terminal with strong signal strength transmits on the same resource unit as another terminal with weak signal strength. In this case, the peer discovery signal from the weak terminal may be masked or desensed by the peer discovery signal from the strong terminal.

In an aspect, a terminal may transmit its peer discovery signal in different slots selected based on time hopping in order to combat the problems described above due to half-duplex operation and desensing. In one design, different slots may be selected in different frames based on a time hopping function, which may be defined as follows:

$$n_{t+1}=(n_t+\Delta n) \bmod N, \qquad \text{Eq(1a)}$$

$$\Delta n = f(m_0, n_0, t), \qquad \text{Eq(1b)}$$

where $\Delta n$ is a slot offset or change in slot from one frame to the next, $m_0$ is an initial subcarrier set selected for the first frame t=0, $n_0$ is an initial slot selected for the first frame, $f(x)$ is a function of one or more parameters collectively denoted as x, $n_t$ is a slot selected for transmission in frame t, and "mod" denotes a modulo operation.

In equation (1a), addition and modulo operation may be performed in a Galois field of N elements 0 through N−1. Slot $n_t$ may be used in frame t. The initial slot $n_0$ may be selected for the first frame t=0 in various manners, as described below. The slot $n_{t+1}$ to use in each subsequent frame may be computed by an offset of $\Delta n$ from the slot $n_t$ used in the preceding frame, with wrap around due to the modulo N operation. The selected slots thus shift by a constant amount of $\Delta n$ across frames. $\Delta n$ and N may be relatively prime so that all N different slots 0 through N−1 are selected in N consecutive frames. N terminals may select N different initial slots and use the same $\Delta n$. These terminals would then use different slots in each frame. Another terminal may use a different $\Delta n$ and may then collide with each of the N terminals once in a span of N frames. A collision occurs when multiple terminals use the same slot (or the same resource unit) for transmission of their peer discovery signals and are unable to detect one another with half-duplex operation.

In one design, the slot offset $\Delta n$ is a fixed value for all frames. In another design, the slot offset is a fixed value for each round of N frames but can change from round to round. In yet another design, the slot offset can change from frame to frame. The slot offset may also be defined in other manners.

In another design, the time hopping function may be defined as follows:

$$n_t = PN(t), \qquad \text{Eq (2)}$$

where PN(t) is a pseudo-random number (PN) function that provides a pseudo-random value within a range of 0 through N−1 when invoked. The PN function may be implemented with a linear feedback shift register (LFSR) implementing a particular generator polynomial. Different terminals may use different seed values for the LFSR. A terminal may then collide with another terminal in a pseudo-random manner.

In yet another design, the time hopping function may be defined based on a Latin square. An N×N Latin square is a table filled with N different elements (or numeric values) such that each element occurs only once in each column and only once in each row. An exemplary 3×3 Latin square $L_1$ and two exemplary 4×4 Latin squares $L_2$ and $L_3$ may be given as follows:

$$L_1 = \begin{bmatrix} 0 & 1 & 2 \\ 1 & 2 & 0 \\ 2 & 0 & 1 \end{bmatrix}$$

$$L_2 = \begin{bmatrix} 0 & 1 & 2 & 3 \\ 1 & 0 & 3 & 2 \\ 2 & 3 & 0 & 1 \\ 3 & 2 & 1 & 0 \end{bmatrix}$$

$$L_3 = \begin{bmatrix} 0 & 2 & 3 & 1 \\ 1 & 3 & 2 & 1 \\ 2 & 0 & 1 & 3 \\ 3 & 1 & 0 & 2 \end{bmatrix}.$$

An N×N Latin square may be systematically generated using a sequence of 0 through N−1 for the first row and using this sequence cyclically shifted by n for the n-th row. A Latin square may also be generated based on other permutations of the N different elements.

In one design, N terminals may use N different rows of a Latin square, and each terminal may use the slots indicated by the sequence of elements in its row. For example, a terminal using the second row of Latin square $L_1$ may use slot 1 in frame t, then slot 2 in frame t+1 then slot 0 in frame t+2, then back to slot 1 in frame t+3, etc. Because of the structure of the Latin square, terminals using different rows of the Latin square would use different slots in different frames and can thus detect one another even with half-duplex operation.

FIG. 3 shows example transmission of peer discovery signals by five terminals with time hopping based on Latin squares $L_2$ and $L_3$ given above. In this example, the frames used for transmission of peer discovery signals are non-contiguous and assigned indices of t, t+1, etc. Each frame includes four slots 0 through 3, and four subcarrier sets 0 through 3 are available.

In the example shown in FIG. 3, terminal A uses the first row of Latin square $L_2$ and selects slots 0, 1, 2 and 3 in frames t, t+1, t+2 and t+3, respectively. Terminal B uses the second row of Latin square $L_2$ and selects slots 1, 0, 3 and 2 in frames t, t+1, t+2 and t+3, respectively. Terminal C uses the third row of Latin square $L_2$ and selects slots 2, 3, 0 and 1 in frames t, t+1, t+2 and t+3, respectively. Terminal D uses the fourth row of Latin square $L_2$ and selects slots 3, 2, 1 and 0 in frames t, t+1, t+2 and t+3, respectively. Terminal E uses the first row of Latin square $L_3$ and selects slots 0, 2, 3 and 1 in frames t, t+1, t+2 and t+3, respectively.

As shown in FIG. 3, terminals A through D using the four rows of the same Latin square $L_2$ select four different slots in each frame. Terminal E using the first row of Latin square $L_3$ collides with each of terminals A through D only once in four frames. In particular, terminal E selects the same slot 0 as terminal A in frame t, the same slot 2 as terminal D in frame t+1, the same slot 3 as terminal B in frame t+2, and the same slot 1 as terminal C in frame t+3. Terminal E can thus receive the peer discovery signals from terminals A through D in three of the four frames, and vice versa.

FIG. 3 shows example use of Latin squares $L_2$ and $L_3$ for time hopping. Time hopping may also be achieved with other time hopping functions, e.g., as shown in equations (1a) and (2). In the example shown in FIG. 3, terminals A through D select different subcarrier sets, and each terminal uses its selected subcarrier set in all frames. Multiple terminals (e.g., terminals C and E) may select the same subcarrier set and may rely on time hopping to mitigate collision of their peer discovery signals.

As shown in FIG. 3, the use of time hopping may mitigate issues associated with half-duplex operation and desense. Each terminal may use different slots (instead of a fixed slot) across frames, and the slots may be selected to avoid or reduce collision with slots used by other terminals. This may reduce the amount of time needed by a terminal to detect other terminals and to be detected by the other terminals.

In another aspect, a terminal may transmit its peer discovery signal on resource units selected based on time and frequency hopping. In one design, different resource units may be selected in different frames based on a time and frequency hopping function, which may be defined as follows:

$$m_{t+1}=(m_t+\Delta m) \bmod M, \text{ and} \quad \text{Eq(3a)}$$

$$n_{t+1}=(n_t+\Delta n) \bmod N, \quad \text{Eq (3b)}$$

where $\Delta m$ is an offset or change in subcarrier set from one frame to the next, and $m_t$ is a subcarrier set selected for use in frame t.

In equation set (3), addition and modulo operation may be performed in Galois fields of sizes M and N. A resource unit $(m_t, n_t)$ may be used in frame t. An initial subcarrier set $m_0$ and an initial slot $n_0$ may be selected for the first frame t=0 in various manners, as described below. The subcarrier set $m_{t+1}$ to use in each subsequent frame may be computed by an offset of $\Delta m$ from the subcarrier set $m_t$ used in the preceding frame. The slot $n_{t+1}$ to use in each subsequent frame may be computed by an offset of $\Delta n$ from the slot $n_t$ used in the preceding frame. The selected subcarrier sets thus shift by a constant amount of $\Delta m$ across frames, and the selected slots shift by a constant amount of $\Delta n$ across frames. $\Delta m$ and M may be relatively prime so that all M subcarrier sets 0 through M−1 are selected in M consecutive frames. $\Delta m$ may also be equal to zero to disable frequency hopping. $\Delta n$ and N may be relatively prime so that all N different slots 0 through N−1 are selected in N consecutive frames. If M≦N, then a terminal using a given set of parameters ($\Delta m$, $\Delta n$, $m_0$ and $n_0$) may be able to detect other terminals not using that same set of parameters after only one round of N frames. If M>N, then different terminals may use the same slot more than once during a round of N frames. The time and frequency hopping function may repeat after N−1 rounds.

In another design, the time and frequency hopping function may be defined as follows:

$$m_{t+1}=(m_t+\Delta m) \bmod M, \text{ and} \quad \text{Eq(4a)}$$

$$n_{t+1}=(n_t+m_0) \bmod N. \quad \text{Eq (4b)}$$

Equation set (4) may be considered as a special case of equation set (3), with $\Delta n = m_0$. Performing time hopping based on the initial subcarrier set $m_0$ may mitigate collision. Multiple terminals may select the same initial slot $n_0$ but different initial subcarrier sets. These terminals may then select different slots across frames due to the use of $m_0$ as the slot offset $\Delta n$, as shown in equation (4b). Multiple terminals may select the same initial subcarrier set $m_0$ but different initial slots. These terminals may then select different slots across frames due to the use of different initial slots, as also shown in equation (4b).

FIG. 4 shows example transmission of peer discovery signals by five terminals based on the time and frequency hopping function shown in equation set (4). In this example, the frames used for transmission of peer discovery signals are non-contiguous and assigned indices of t, t+1, etc. Each frame includes four slots 0 through 3, and four subcarrier sets 0 through 3 are available. Each slot n includes four resource units (0, n) through (3, n).

In the example shown in FIG. 4, terminal A uses parameters $\Delta m=3$, $m_0=1$, and $n_0=0$. This results in terminal A selecting resource units (1, 0), (0, 1), (3, 2) and (2, 3) in frames t, t+1, t+2 and t+3, respectively. Terminal B uses parameters $\Delta m=3$, $m_0=2$, and $n_0=0$ with only $m_0$ being different from the parameters used by terminal A. This results in terminal B selecting resource units (2, 0), (1, 2), (0, 0) and (3, 2) in frames t, t+1, t+2 and t+3, respectively. Terminal C uses parameters $\Delta m=3$, $m_0=3$, and $n_0=0$ with only $m_0$ being different from the parameters used by terminal A. This results in terminal C selecting resource units (3, 0), (2, 3), (1, 2) and (0, 1) in frames t, t+1, t+2 and t+3, respectively. Terminal D uses parameters $\Delta m=3$, $m_0=0$ and $n_0=0$ with only $m_0$ being different from the parameters used by terminal A. This results in terminal D selecting resource units (0, 0), (3, 0), (2, 0) and (1, 0) in frames t, t+1, t+2 and t+3, respectively. Terminal E uses parameters $\Delta m=3$, $m_0=1$, and $n_0=1$, with only $n_0$ being different from the parameters used by terminal A. This results in terminal E selecting resource units (1, 1), (0, 2), (3, 3) and (2, 0) in frames t, t+1, t+2 and t+3, respectively.

As illustrated by the example shown in FIG. 4, with time and frequency hopping, the resource units used by a terminal may have different time and frequency shifts as a function of frame index t, subcarrier set index m, and slot index n. The time and frequency shifts may be determined by a time and frequency hopping function, which may be defined to avoid or reduce collision between different terminals.

In yet another design, the time and frequency hopping function may be defined based on a set of M×N squares. Each square may have the same dimension as one frame. The N columns of a square may correspond to the N slots in a frame, the M rows of the square may correspond to the M subcarrier sets, and each element of the square may correspond to one resource unit in the frame. Each square may be filled with M*N unique elements that may be assigned to M*N different terminals.

Three exemplary 3×3 squares $U_1$, $U_2$ and $U_3$ may be given as follows:

$$U_1 = \begin{bmatrix} 0 & 1 & 2 \\ 3 & 4 & 5 \\ 6 & 7 & 8 \end{bmatrix}$$

$$U_2 = \begin{bmatrix} 0 & 1 & 2 \\ 5 & 3 & 4 \\ 7 & 8 & 6 \end{bmatrix}$$

$$U_3 = \begin{bmatrix} 0 & 1 & 2 \\ 4 & 5 & 3 \\ 8 & 6 & 7 \end{bmatrix}.$$

In the example given above, the second row of squares $U_2$ and $U_3$ is cyclically shifted by one and two positions, respectively, to the right relative to the second row of square $U_1$. The third row of squares $U_2$ and $U_3$ is cyclically shifted by two and four positions, respectively, to the right relative to the third row of square $U_1$. Each element may be assigned to a different terminal, which may use the resource units at the positions to which that element is mapped. For example, terminal A may be assigned element "0" in squares $U_1$, $U_2$ and $U_3$ and may then use resource units (0, 0), (0, 0) and (0, 0) in frames t, t+1 and t+2, respectively. Terminal B may be assigned element "4" in squares $U_1$, $U_2$ and $U_3$ and may then use resource units (1, 1), (1, 2) and (1, 0) in frames t, t+1 and t+2, respectively.

Squares $U_1$, $U_2$ and $U_3$ may be generated based on equation (1a) with a specific value of $\Delta n$. In general, the squares may be generated in any manner to obtain the desired properties. In the example given above, each element occurs in the same column with any other element at most once over the three squares. This may allow each terminal assigned with one element to detect other terminals assigned with other elements by the time the three-frame hopping function is completed. No terminal desenses any other terminal by overpowering transmissions in the same resource unit.

The rows of the M×N squares may be permuted to achieve frequency hopping. For example, the rows of squares $U_1$, $U_2$ and $U_3$ may be permuted to obtain squares $V_1$, $V_2$ and $V_3$, respectively, as follows:

$$V_1 = \begin{bmatrix} 0 & 1 & 2 \\ 3 & 4 & 5 \\ 6 & 7 & 8 \end{bmatrix}$$

$$V_2 = \begin{bmatrix} 5 & 3 & 4 \\ 7 & 8 & 6 \\ 0 & 1 & 2 \end{bmatrix}$$

$$V_3 = \begin{bmatrix} 8 & 6 & 7 \\ 0 & 1 & 2 \\ 4 & 5 & 3 \end{bmatrix}.$$

In the example given above, the columns of square $V_2$ are cyclically shifted up by one position relative to the columns of square $U_2$. The columns of square $V_3$ are cyclically shifted up by two positions relative to the columns of square $U_3$. For each square V, the three columns correspond to three slots, the three rows correspond to three subcarrier sets, and each element of square V correspond to one resource unit. Each element may be assigned to a different terminal, which may use the resource units at the position to which that element is mapped. For example, terminal A may be assigned element "0" in squares $V_1$, $V_2$ and $V_3$ and may then use resource units (0, 0), (2, 0) and (1, 0) in frames t, t+1 and t+2, respectively. Terminal B may be assigned element "4" in squares $V_1$, $V_2$ and $V_3$ and may then use resource units (1, 1), (0, 2) and (2, 0) in frames t, t+1 and t+2, respectively.

In general, different slots may be selected over time based on a time hopping function, as follows:

$$n_1 = \eta(t), \quad \text{Eq (5)}$$

where $\eta(t)$ is the time hopping function, which may be any of the time hopping functions described above. Time hopping function $\eta( )$ may also be a function of other parameters (e.g., $n_t$, $\Delta n$, $m_0$, etc.) besides frame index t.

Different subcarrier sets may also be selected over time based on a frequency hopping function, as follows:

$$m_1 = g(t), \quad \text{Eq (6)}$$

where $g(t)$ is the frequency hopping function, which may be any of the frequency hopping functions described above. Frequency hopping function $g( )$ may also be a function of other parameters (e.g., $m_t$, $\Delta m$, etc.) besides frame index t.

Different slots and different subcarrier sets may also be jointly selected over time based on a time and frequency hopping function, as follows:

$$(m_t, n_t) = h(t), \quad \text{Eq (7)}$$

where h(t) is the time and frequency hopping function. Time and frequency hopping function h( ) may also be a function of other parameters (e.g., $m_t$, $n_t$, $\Delta m$, $\Delta n$, etc.) besides frame index t.

For all hopping designs, a terminal may send a first transmission of a peer discovery signal on resource unit $(m_0, n_0)$. The terminal may send a subsequent transmission of the peer discovery signal on resource unit $(m_t, n_t)$, for t=1, 2, 3 . . . . Slot index $n_t$ may change from frame to frame with time hopping. Subcarrier set index $m_t$ may change from frame to frame with frequency hopping. The use of resource units in different slots and possibly different subcarrier sets over time may allow the terminal to detect other terminals and to be detected by the other terminals more quickly.

When a terminal initially powers up or moves into a new area, the terminal may select an initial subcarrier set $m_0$ and an initial slot $n_0$ to use for transmitting its peer discovery signal. The terminal may select parameters $m_0$ and $n_0$ in various manners. In one design, the terminal may measure the received power of each resource unit in one frame, e.g., in frame t−L, where L may be one or greater. The terminal may measure M*N received powers for the M*N resource units in frame t−L. The terminal may then select the resource unit with the lowest received power. The terminal may then determine the initial subcarrier set $m_0$ and the initial slot $n_0$ to use in frame t based on the subcarrier set index and the slot index of the selected resource unit in frame t−L. The terminal may also measure a signal-to-noise ratio (SNR) or some other metric (instead of received power) for each resource unit. In any case, this design may result in selection of a resource unit that has the least amount of interference from other terminals. In another design, the terminal may randomly select the initial subcarrier set $m_0$ and/or the initial slot $n_0$. The terminal may also select $m_0$ and $n_0$ in other manners. In general, the terminal may select a set of parameters ($\Delta m$, $\Delta n$, $m_0$, $n_0$, etc.) based on any information such as channel conditions, a terminal identifier (ID), pseudo-random values, etc.

A terminal may determine a set of parameters to use to select slots or resource units. This set may include parameters $\Delta n$ and $n_0$ for the time hopping function shown in equation (1a), parameters $\Delta m$, $\Delta n$, $m_0$ and $n_0$ for the time and frequency hopping function shown in equation set (3), or parameters $\Delta m$, $m_0$ and $n_0$ for the time and frequency hopping function shown in equation set (4). In one design, the terminal may use the same set of parameters to select different slots or resource units to use for transmitting its peer discovery signal. In another design, the terminal may use different sets of parameters in different time intervals. For example, the hopping function may repeat in each time interval or round, and the terminal may select a different set of parameters for each time interval. This design may be used to combat a scenario in which multiple terminals use the same set of parameters starting in the same frame and hence select the same slots or resource units for their peer discovery signals.

In one design, the same hopping function may be used over time. In another design, different hopping functions may be used in different time intervals.

Two terminals may decide to transmit starting in the same frame t and may select the same initial subcarrier set index $m_0$ and the same initial slot index $n_0$. These terminals may collide for the duration of the hopping function. The probability of collision may be reduced by carefully selecting the initial resource unit $(m_0, n_0)$, for example, by measuring the receive powers of different resource units in a frame and selecting the resource unit with the lowest received power. Furthermore, even if the terminals collide for some time, they may randomly halt and re-measure the channel or may be instructed by other means to select another initial resource unit for the next round. The probability of persistent collision may also be reduced in other manners.

For all hopping designs described above, the terminals may know or can ascertain the hopping function and pertinent parameters to use to select different slots or resource units. In one design, the hopping function and pertinent parameters (e.g., $\Delta m$ and $\Delta n$) may be known a priori by the terminals. Each terminal can transmit its peer discovery signal as well as detect for peer discovery signals from other terminals based on the known hopping function and parameters. Changes to the hopping function and/or parameters, if any, may also be known a priori by the terminals. For example, the changes may be based on predetermined rule and as a function of frame timing. In another design, the hopping function and/or pertinent parameters may be provided via broadcast information, e.g., from base stations or other broadcast sources. In another design, the hopping function may be known a priori and the pertinent parameters may be provided via broadcast information.

For clarity, much of the description above covers transmission of peer discovery signals in different slots or resource units selected with time hopping or time and frequency hopping, respectively. In general, any information may be sent in the selected slots or resource units. For example, a terminal may send its user ID, a network ID, its capability, page messages for other terminals, broadcast information for other terminals, etc., in the selected slots or resource units.

FIG. 5 shows a design of a process 500 for transmission with time hopping in a wireless network. Process 500 may be performed by a terminal (as described below) or by some other entity. The terminal may select different slots to use for transmission in a plurality of frames, with each frame comprising multiple slots, each slot covering a particular time duration, and the selected slots being at different time locations in the plurality of frames (block 512). For example, the terminal may select slot 0, 1, 2 and 3 in four frames, as shown for terminal A in FIG. 3. The terminal may send a signal (e.g., a peer discovery signal) in the selected slots in the plurality of frames (block 514).

In one design of block 512, the terminal may select an initial slot in the first frame and may select a slot in each remaining frame based on the initial slot, e.g., as shown in equation (1a). In another design, the terminal may select an initial slot in the first frame, select an initial subcarrier set among multiple subcarrier sets, and select a slot in each remaining frame based on the initial slot and the initial subcarrier set, e.g., as shown in equation (4b). In general, the terminal may select a slot in each frame based on a predetermined hopping function, a pseudo-random hopping function, a Latin square, etc. The terminal may receive timing information from a timing source (e.g., a base station), determine frame timing based on the timing information, and select the different slots based on a function of the frame timing.

In one design of block 514, the terminal may send a peer discovery signal in the selected slots for use by other terminals to detect the terminal. The terminal may support half-duplex operation and may detect for signals (e.g., peer discovery signals) from other terminals in slots not used for transmission by the terminal (block 516).

FIG. 6 shows a design of an apparatus 600 for transmission with time hopping. Apparatus 600 includes a module 612 to select different slots to use for transmission in a plurality of frames, with each frame comprising multiple slots, each slot covering a particular time duration, and the selected slots being at different time locations in the plurality of frames, a module 614 to send a signal (e.g., a peer discovery signal) in the selected slots in the plurality of frames, and a module 616 to detect for signals (e.g., peer discovery signals) from other terminals in slots not used for transmission by the terminal.

FIG. 7 shows a design of a process 700 for transmission with time and frequency hopping in a wireless network. Process 700 may be performed by a terminal (as described below) or by some other entity. The terminal may select different resource units to use for transmission in a plurality of frames, with the selected resource units being at different time and frequency locations in the plurality of frames (block 712). The terminal may send a signal (e.g., a peer discovery signal) on the selected resource units in the plurality of frames (block 714). The terminal may detect for signals (e.g., peer discovery signals) from other terminals in slots not used for transmission by the terminal (block 716).

In one design of block 712, the terminal may select an initial subcarrier set among multiple subcarrier sets and may select a subcarrier set for each frame based on the initial subcarrier set, e.g., as shown in equation (4a). The terminal may select an initial slot in the first frame and may select a slot in each remaining frame based on the initial slot and the initial subcarrier set, e.g., as shown in equation (4a). The selected resource units may be determined by the different subcarrier sets and the different slots selected in the plurality of frames. In one design, the terminal may measure the received powers of a plurality of resource units in a frame, select an initial resource unit based on the received powers of the plurality of resource units, and determine the initial slot and the initial subcarrier set for the first frame based on the initial resource unit. The terminal may also select different resource units in other manners.

FIG. 8 shows a design of an apparatus 800 for transmission with time and frequency hopping. Apparatus 800 includes a module 812 to select different resource units to use for transmission in a plurality of frames, with the selected resource units being at different time and frequency locations in the plurality of frames, a module 814 to send a signal (e.g., a peer discovery signal) on the selected resource units in the plurality of frames, and a module 816 to detect for signals (e.g., peer discovery signals) from other terminals in slots not used for transmission.

The modules in FIGS. 6 and 8 may comprise processors, electronics devices, hardware devices, electronics components, logical circuits, memories, etc., or any combination thereof.

Figure 9:
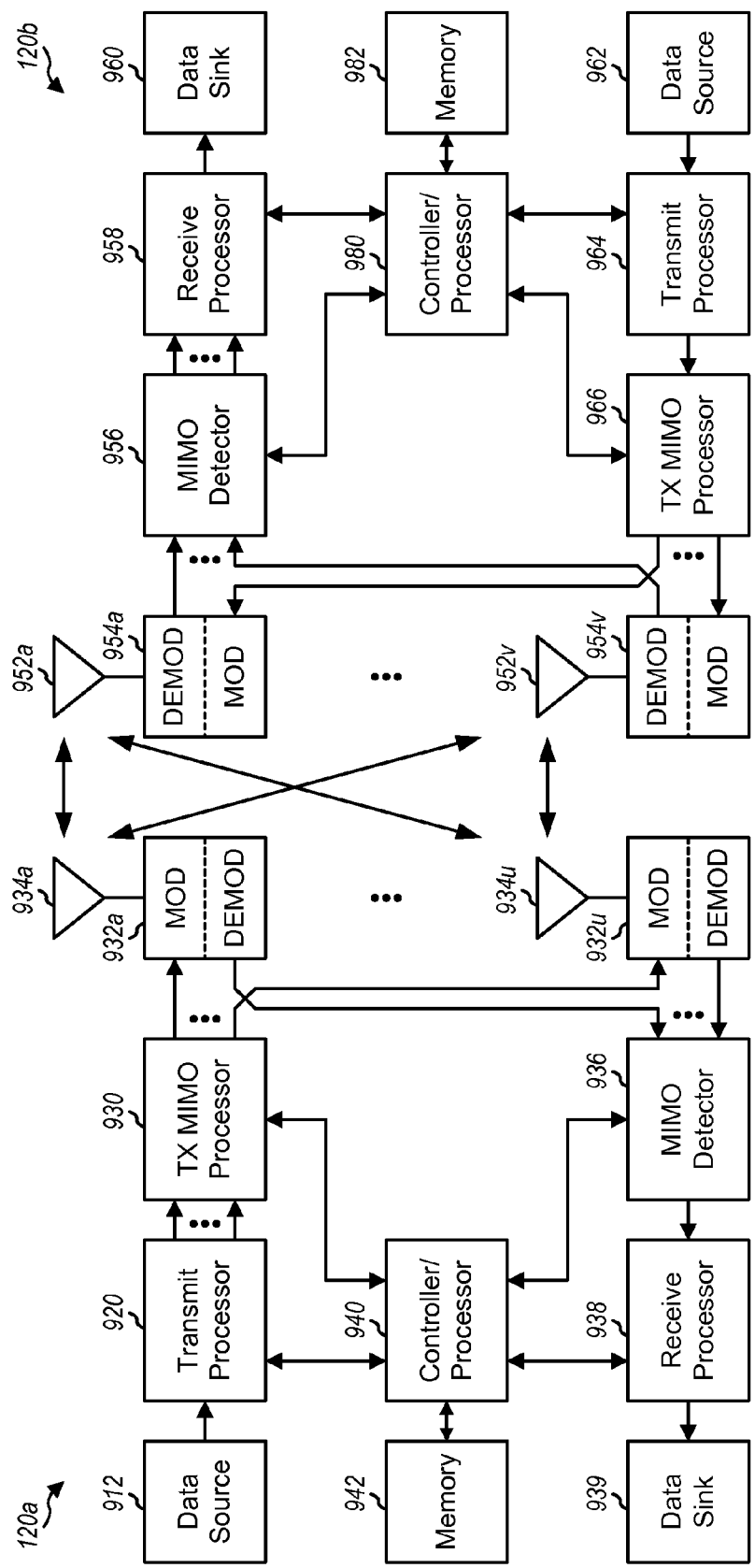
FIG. 9 shows a block diagram of two terminals.

FIG. 9 shows a block diagram of a design of terminals 120*a* and 120*b*, which are two terminals in wireless network 100 in FIG. 1. In this design, terminal 120*a* is equipped with U antennas 934*a* through 934*u*, and terminal 120*b* is equipped with V antennas 952*a* through 952*v*, where in general U≧1 and V≧1.

At terminal 120*a*, a transmit processor 920 may receive data from a data source 912 and control information from a controller/processor 940. The control information may comprise a terminal ID, other information to send in a peer discovery signal, etc. Transmit processor 920 may process (e.g., encode, interleave, and symbol map) the data and control information and provide data symbols and control symbols, respectively. A transmit (TX) multiple-input multiple-output (MIMO) processor 930 may perform spatial processing (e.g., preceding) on the data symbols, the control symbols, and/or pilot symbols, if applicable, and may provide U output symbol streams to U modulators (MODs) 932*a* through 932*u*. Each modulator 932 may process a respective output symbol stream (e.g., for OFDM, SC-FDM, etc.) to obtain an output sample stream. Each modulator 932 may further process (e.g., convert to analog, amplify, filter, and upconvert) the output sample stream to obtain a radio frequency (RF) signal. U RF signals from modulators 932*a* through 932*u* may be transmitted via U antennas 934*a* through 934*u*, respectively.

At terminal 120*b*, antennas 952*a* through 952*v* may receive the RF signals from terminal 120*a* and may provide received signals to demodulators (DEMODs) 954*a* through 954*v*, respectively. Each demodulator 954 may condition (e.g., filter, amplify, downconvert, and digitize) a respective received signal to obtain received samples. Each demodulator 954 may further process the received samples (e.g., for OFDM, SC-FDM, etc.) to obtain received symbols. A MIMO detector 956 may obtain received symbols from all R demodulators 954*a* through 954*r*, perform MIMO detection on the received symbols if applicable, and provide detected symbols. A receive processor 958 may process (e.g., demodulate, deinterleave, and decode) the detected symbols, provide decoded data to a data sink 960, and provide decoded control information to a controller/processor 980.

At terminal 120*b*, data from a data source 962 and control information from controller/processor 980 may be processed by a transmit processor 964, precoded by a TX MIMO processor 966 if applicable, further processed by modulators 954, and transmitted via antennas 952. At terminal 120*a*, the RF signals from terminal 120*b* may be received by antennas 934, processed by demodulators 932, detected by a MIMO detector 936 if applicable, and further processed by a receive processor 938 to obtain the decoded data and control information transmitted by terminal 120*b*.

Each terminal 120 may generate and transmit a peer discovery signal to other terminals, e.g., using transmit processor 920, TX MIMO processor 930, and modulators 932 at terminal 120*a*. Each terminal 120 may also detect for peer discovery signals from other terminals, e.g., using demodulators 952, MIMO detector 956, and receive processor 958 at terminal 120*b*. Each terminal 120 may also receive and process signals from base stations and/or other transmitter stations to obtain timing information.

Controllers/processors 940 and 980 may direct the operation at terminals 120*a* and 120*b*, respectively. Controllers/processors 940 and 980 may (i) select different slots or resource units to use to send peer discovery signals for terminals 120*a* and 120*b*, respectively, and (ii) determine slots or resource units to receive peer discovery signals from other terminals. Controllers/processors 940 and 980 may each perform or direct process 500 in FIG. 5, process 700 in FIG. 7, and/or other processes for the techniques described herein. Memories 942 and 982 may store data and program codes for terminals 120*a* and 120*b*, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    selecting different slots to use for transmission in a plurality of frames, each frame comprising multiple slots, each slot within a frame covering a particular time duration, and the selected slots being at different time locations in the plurality of frames, said different slots including a first selected slot located at a first time location in a first frame and a second selected slot located at a second time location in a second frame, said second time location having a different time offset from the start of said second frame than said first time location has from the start of said first frame; and
    sending a signal in the selected slots in the plurality of frames.

2. The method of claim 1, wherein the selecting different slots comprises selecting an initial slot in the first frame of the plurality of frames, said initial slot being said first selected slot; and
    selecting a slot in each remaining frame based on the time location of the initial slot.

3. The method of claim 1, wherein the selecting different slots comprises:
    selecting an initial slot in the first frame of the plurality of frames, said initial slot being said first selected slot;
    selecting an initial subcarrier set among multiple subcarrier sets, and
    selecting a slot in each remaining frame based on the initial slot and the initial subcarrier set.

4. The method of claim 1, wherein the different slots to use for transmission are selected based on $$n_{t+1} = (n_t + \Delta n) \bmod N,$$

where $n_t$ is a slot to use in frame t,
    $\Delta n$ is an offset as a function of at least one of an initial subcarrier set $m_0$, an initial slot $n_0$, and frame t,
    N is the number of slots in each frame, and
    "mod" denotes a modulo operation.

5. The method of claim 1, wherein the selecting different slots comprises:
    selecting a slot location in each frame based on a predetermined hopping function, a pseudo-random hopping function, or a Latin square, slots corresponding to different slot locations being selected in different frames.

6. The method of claim 1, further comprising:
    selecting different subcarrier sets to use for transmission in the plurality of frames, and wherein the sending the signal comprises sending the signal on resource units determined by the selected subcarrier sets and the selected slots in the plurality of frames.

7. The method of claim 6, wherein the selecting different subcarrier sets comprises:
    selecting an initial subcarrier set among multiple subcarrier sets, and
    selecting a subcarrier set for each frame based on the initial subcarrier set.

8. The method of claim 6, wherein different slots and different subcarrier sets are selected based on $$n_{t+1}=(n_t+\Delta n)\bmod N, \text{ and}$$

$$m_{t+1}=(m_t+\Delta m)\bmod M,$$

where $\Delta n$ is a slot offset, $\Delta m$ is a subcarrier set offset, $n_t$ is a slot to use in frame t, $m_t$ is a subcarrier set to use in frame t, N is the number of slots in each frame, M is the number of subcarrier sets, and "mod" denotes a modulo operation.

9. The method of claim 8, wherein $\Delta n$ is a function of at least one of an initial subcarrier set $m_0$ selected for a first frame of the plurality of frames, an initial slot $n_0$ selected for the first frame, and frame t.

10. The method of claim 8, wherein $\Delta m$ is a function of at least one of an initial subcarrier set $m_0$ selected for a first frame of the plurality of frames, an initial slot $n_0$ selected for the first frame, and frame t.

11. The method of claim 6, further comprising:
measuring received powers of a plurality of resource units in at least one frame;
selecting an initial resource unit based on the received powers of the plurality of resource units; and
determining an initial slot and an initial subcarrier set for the first frame of the plurality of frames based on the initial resource unit, said initial slot being said first selected slot.

12. The method of claim 6, further comprising:
pseudo-randomly selecting an initial slot and an initial subcarrier set for the first frame of the plurality of frames, said initial slot being said first selected slot.

13. The method of claim 1, wherein the sending the signal comprises sending a peer discovery signal in the selected slots from a terminal for use by other terminals to detect the terminal.

14. The method of claim 13, further comprising:
detecting for peer discovery signals from other terminals in slots not used for transmission by the terminal.

15. The method of claim 1, further comprising:
receiving timing information from a timing source;
determining frame timing based on the timing information; and
selecting different slots in the plurality of frames based on a function of the frame timing.

16. An apparatus for wireless communication, comprising:
at least one processor configured to:
select different slots to use for transmission in a plurality of frames, each frame comprising multiple slots, each slot within a frame covering a particular time duration, the selected slots being at different time locations in the plurality of frames, said different slots including a first selected slot located at a first time location in a first frame and a second selected slot located at a second time location in a second frame, said second time location having a different time offset from the start of said second frame than said first time location has from the start of said first frame; and
send a signal in the selected slots in the plurality of frames.

17. The apparatus of claim 16, wherein the at least one processor is configured to select an initial slot in the first frame of the plurality of frames, said initial slot being said first selected slot, and to select a slot in each remaining frame based on the initial slot.

18. The apparatus of claim 16, wherein the at least one processor is configured to select different subcarrier sets to use for transmission in the plurality of frames, and to send the signal on resource units determined by the selected subcarrier sets and the selected slots in the plurality of frames.

19. The apparatus of claim 18, wherein the at least one processor is configured to determine an initial slot and an initial subcarrier set for the first frame of the plurality of frames based on received powers of a plurality of resource units in a frame, said initial slot being said first selected slot.

20. The apparatus of claim 16, wherein the at least one processor is configured to send a peer discovery signal in the selected slots from a terminal for use by other terminals to detect the terminal, and to detect for peer discovery signals from the other terminals in slots not used for transmission by the terminal.

21. An apparatus for wireless communication, comprising:
means for selecting different slots to use for transmission in a plurality of frames, each frame comprising multiple slots, each slot within a frame covering a particular time duration, and the selected slots being at different time locations in the plurality of frames, said different slots including a first selected slot located at a first time location in a first frame and a second selected slot located at a second time location in a second frame, said second time location having a different time offset from the start of said second frame than said first time location has from the start of said first frame; and
means for sending a signal in the selected slots in the plurality of frames.

22. The apparatus of claim 21, wherein the means for selecting different slots comprises:
means for selecting an initial slot in the first frame of the plurality of frames, said initial slot being said first selected slot; and
means for selecting a slot in each remaining frame based on the initial slot.

23. The apparatus of claim 21, further comprising:
means for selecting different subcarrier sets to use for transmission in the plurality of frames, and wherein the means for sending the signal comprises means for sending the signal on resource units determined by the selected subcarrier sets and the selected slots in the plurality of frames.

24. The apparatus of claim 23, further comprising:
means for determining an initial slot and an initial subcarrier set for the first frame of the plurality of frames based on received powers of a plurality of resource units in a frame, said initial slot being said first selected slot.

25. The apparatus of claim 21, wherein the means for sending a signal comprises means for sending a peer discovery signal in the selected slots from a terminal for use by other terminals to detect the terminal, the apparatus further comprising:
means for detecting for peer discovery signals from the other terminals in slots not used for transmission by the terminal.

26. A computer program product, comprising:
a non-transitory computer-readable medium comprising:
code for causing at least one computer to select different slots to use for transmission in a plurality of frames, each frame comprising multiple slots, each slot within a frame covering a particular time duration, and the selected slots being at different time locations in the plurality of frames, said different slots including a first selected slot located at a first time location in a first frame and a second selected slot located at a second time location in a second frame, said second time location having a different time offset from the start of said second frame than said first time location has from the start of said first frame; and code for causing the at least one computer to send a signal in the selected slots in the plurality of frames.

27. The computer program product of 26, the non-transitory computer-readable medium further comprising:

code for causing the at least one computer to select different subcarrier sets to use for transmission in the plurality of frames, and code for causing the at least one computer to send the signal on resource units determined by the selected subcarrier sets and the selected slots in the plurality of frames.

28. A method for wireless communication, comprising:

selecting different resource unit to use for transmission in a plurality of frames, the selected resource units being at different time and frequency locations in the plurality of frames, said different resource units including a first resource unit located at a first time location in a first frame and a second resource unit located at a second time location in a second frame, said second resource unit having a different time offset from the start of said second frame than said first resource unit has from the start of said first frame, said first and second resource units corresponding to different frequencies; and sending a signal on the selected resource units in the plurality of frames.

29. The method of claim 28, wherein the selecting different resource units comprises selecting an initial resource unit in the first frame of the plurality of frames, said initial resource unit being the first resource unit; and selecting a resource unit in each remaining frame based on the initial resource unit.

30. The method of claim 28, wherein the sending a signal comprises sending a peer discovery signal on the selected resource units from a terminal for use by other terminals to detect the terminal, the method further comprising:

detecting for peer discovery signals from the other terminals in slots not used for transmission by the terminal.

* * * * *